United States Patent
Kumar et al.

(10) Patent No.: US 11,425,086 B2
(45) Date of Patent: Aug. 23, 2022

(54) USING DNS TO COMMUNICATE MC-TCP CAPABILITY OF SERVER DEVICES

(71) Applicant: Juniper Networks, Inc., Sunnyvale, CA (US)

(72) Inventors: Rajneesh Kumar, Bangalore (IN); Bharat Dhaker, Bangalore (IN); Peyush Gupta, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/438,200

(22) Filed: Jun. 11, 2019

(65) Prior Publication Data
US 2020/0396200 A1   Dec. 17, 2020

(51) Int. Cl.
*H04L 29/12* (2006.01)
*H04L 61/4511* (2022.01)
*H04L 61/5061* (2022.01)
*H04L 101/663* (2022.01)

(52) U.S. Cl.
CPC ...... *H04L 61/1511* (2013.01); *H04L 61/2061* (2013.01); *H04L 61/6063* (2013.01)

(58) Field of Classification Search
CPC ......... H04L 29/06; H04L 61/10; H04L 61/15; H04L 61/20; H04L 61/30; H04L 65/00; H04L 69/00
USPC ................................ 709/203, 228, 244–245
See application file for complete search history.

(56) References Cited

U.S. PATENT DOCUMENTS

| | | | |
|---|---|---|---|
| 7,254,626 B1 * | 8/2007 | Kommula | H04L 67/1021 709/224 |
| 2009/0074008 A1 * | 3/2009 | Sargent | H04L 47/193 370/469 |
| 2011/0082931 A1 * | 4/2011 | Wang | H04L 61/1511 709/224 |

(Continued)

FOREIGN PATENT DOCUMENTS

| | | |
|---|---|---|
| CN | 107872423 A | 4/2018 |
| WO | 2015171023 A1 | 11/2015 |

OTHER PUBLICATIONS

Yonghao Sun; Yong Cui; Wendong Wang; Tianze Ma; Yuri Ismailov; Xin Zheng; Mobility support in Multi-Path TCP; 2011 IEEE 3rd International Conference on Communication Software and Networks. (Year: 2011).*

(Continued)

*Primary Examiner* — Younes Naji
*Assistant Examiner* — Da T Ton
(74) *Attorney, Agent, or Firm* — Shumaker & Sieffert, P.A.

(57) ABSTRACT

This disclosure is related to devices, systems, and techniques for using a Domain Name System (DNS) server to identify one or more network devices capable of operating according to a protocol. For example, a DNS system device includes a memory and one or more processors implemented in circuitry. The one or more processors are configured to receive, from a client device, a DNS query including a specification of a hostname and a request for an MP-TCP capability, determine, using the memory, at least one IP address corresponding to the hostname and corresponding to one of the devices that is MP-TCP capable, and send, to the client device, a DNS response including an indication of the at least one of the IP addresses.

18 Claims, 7 Drawing Sheets

(56) References Cited

U.S. PATENT DOCUMENTS

| | | | |
|---|---|---|---|
| 2012/0290701 A1* | 11/2012 | Mao | H04L 61/1511 709/223 |
| 2013/0275570 A1* | 10/2013 | Treuhaft | H04L 61/1511 709/223 |
| 2015/0281367 A1 | 10/2015 | Nygren et al. | |
| 2016/0226980 A1 | 8/2016 | Albrecht | |
| 2016/0286441 A1* | 9/2016 | Kweon | H04W 36/0066 |
| 2019/0363974 A1* | 11/2019 | Wang | H04L 45/24 |

OTHER PUBLICATIONS

Extended Search Report from counterpart European Application No. 19199444.1, dated Nov. 20, 2019, 8 pp.

Scharf et al., "Multipath TCP (MPTCP) Application Interface Considerations," Internet Engineering Task Force (IETF), RFC 6897, Mar. 2013, 31 pp.

Huston, "Multipath TCP," accessed from https://labs.apnic.net/?cat=12, Jun. 9, 2015, 10 pp.

Sun et al, "Mobility Support in Multi-Path TCP," IEEE, date of conference: May 27-29, 2011, 5 pp.

Nikravesh et al., "An In-depth Understanding of Multipath TCP on Mobile Devices: Measurement and System Design," Oct. 3, 2016, 13 pp.

Wei et al., "MPTCP Proxy Mechanisms," draft-wei-mptcp-proxy-mechanism-02, Internet Draft, Jul. 1, 2015, 11 pp.

Chapter 15 DNS Messages, zytrax.open, http://www.zytrax.com/books/dns/ch15/, last modified Jul. 27, 2017, 10 pp.

Lab 4: DSN Primer Notes, Computer Networks, https://www2.cs.duke.edu/courses/fall16/compsci356/DNS/DNS-primer.pdf, Nov. 17, 2016, 8 pp.

Response to Extended Search Report dated Nov. 20, 2019, from counterpart European Application No. 19199444.1, filed Jun. 16, 2021, 12 pp.

Examination Report from counterpart European Application No. 19199444.1 dated Sep. 21, 2021, 5 pp.

Response to Examination Report dated Sep. 21, 2021, from counterpart European Application No. 19199444.1 filed Jan. 19, 2022, 18 pp.

* cited by examiner

USING DNS TO COMMUNICATE MC-TCP CAPABILITY OF SERVER DEVICES

TECHNICAL FIELD

The disclosure relates to computer networks.

BACKGROUND

A computer network is a collection of interconnected computing devices that can exchange data and share resources. In a packet-based network, such as the Internet, the computing devices communicate data by dividing the data into variable-length blocks called packets, which are individually routed across the network from a source device to a destination device. The destination device extracts the data from the packets and assembles the data into its original form.

A domain name system (DNS) is a system that stores information associated with hostnames in a distributed database on networks, such as the Internet. In particular, the DNS system associates hostnames with corresponding Internet Protocol (IP) addresses. A set of hostnames belonging to an organization can be grouped into a domain by associating each of the hostnames of the organization with a common domain name. In this manner, DNS allows hard-to-remember IP addresses to be associated with easy-to-remember hostnames and/or domain names.

When a computing device executes an application, such as a web browser, email client, or distributed application, and the application makes a request that necessitates a DNS lookup, the application sends a DNS query that includes a hostname to a DNS server. The DNS server retrieves an IP address associated with the hostname indicated in the DNS query. The DNS server returns the IP address in a DNS response to the client application, which uses the IP address to, e.g., access a server hosting a service.

SUMMARY

In general, the disclosure describes devices, systems, and techniques for using a Domain Name System (DNS) server for identifying one or more servers capable of operating according to a protocol. More specifically, a client device of a set of client devices may send a DNS query to the DNS server, where the DNS query includes an indication of a hostname corresponding to a service provider configured to offer a service to the client device. Additionally, the DNS query may include an indication of a request for a network device configured to operate according to the protocol. For example, the indication of the request for a network device configured to operate according to the protocol may include a request for a network device that is capable of operating according to the Multipath Transmission Control Protocol (MP-TCP). An MP-TCP capable client device may be configured to enable a Transmission Control Protocol (TCP) connection between the MP-TCP capable client device and an MP-TCP capable network device (e.g., server) to use two or more paths in order to increase an amount of available bandwidth, thus improving a manner in which the MP-TCP capable client device exchanges data with the MP-TCP capable network device. The DNS server, in some examples, determines a server preferable for offering a service to the client device based on the DNS query and generates a DNS response including an Internet Protocol (IP) address corresponding to the server. In examples where the client device is MP-TCP capable, the DNS server identifies a server that is also MP-TCP capable, improving an experience of a user of the client device.

In some examples, a DNS device includes: a memory configured to store a list of IP addresses for a set of hostnames, at least one of the hostnames having two or more IP addresses, the memory further storing data representing, for each of the IP addresses, whether a network device corresponding to the IP address is capable of performing MP-TCP, the network device being part of a set of network devices; and one or more processors implemented in circuitry. The one or more processors are configured to: receive, from a client device, a DNS query including a specification of a hostname and a request for an MP-TCP capability; determine, using the memory, at least one of the IP addresses corresponding to the hostname and corresponding to one of the network devices that is MP-TCP capable; and send, to the client device, a DNS response including an indication of the at least one of the IP addresses.

In some examples, a method includes receiving, by one or more processors of a DNS device, a DNS query from a client device, the DNS query including a specification of a hostname and a request for an MP-TCP capability, wherein the DNS device comprises a memory configured to store a list of IP addresses for a set of hostnames, at least one of the hostnames having two or more IP addresses, the memory further storing data representing, for each of the IP addresses, whether a network device corresponding to the IP address is capable of performing MP-TCP, the network device being part of a set of network devices; determining, using the memory, at least one of the IP addresses corresponding to the hostname and corresponding to one of the network devices that is MP-TCP capable; and sending, by the one or more processors, a DNS response to the client device, the DNS response including an indication of the at least one of the IP addresses.

In some examples, a method includes sending, by a client device, a DNS query to one or more processors of a DNS device, the DNS query including a specification of a hostname and a request for an MP-TCP capability, wherein the DNS device comprises a memory configured to store a list of IP addresses for a set of hostnames, at least one of the hostnames having two or more IP addresses, the memory further storing data representing, for each of the IP addresses, whether a network device corresponding to the IP address is capable of performing MP-TCP, the network device being part of a set of network devices; and receiving, by the client device, a DNS response including an indication of at least one of the IP addresses corresponding to the hostname and corresponding to one of the network devices that is MP-TCP capable.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

DETAILED DESCRIPTION

Figure 1:
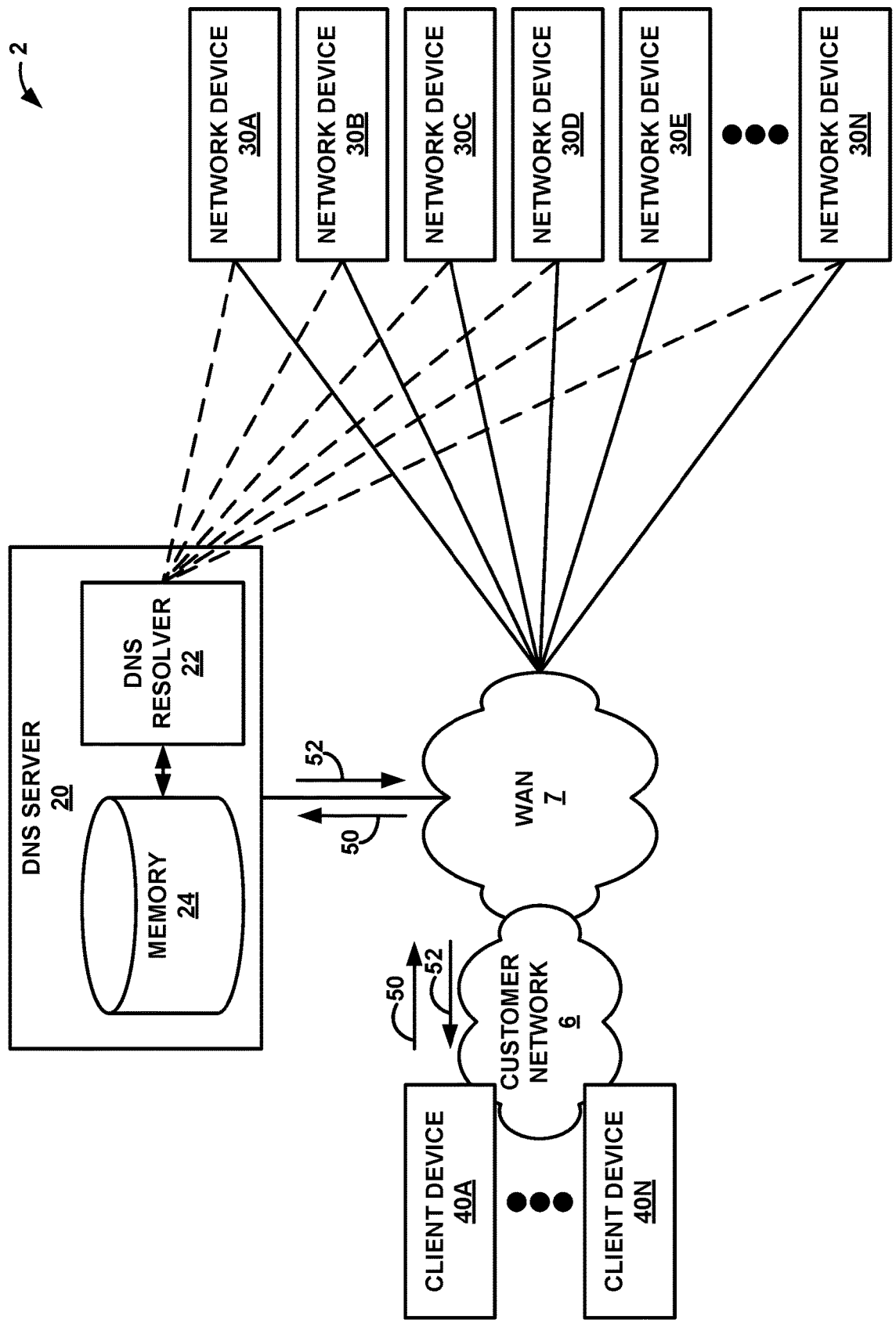
FIG. 1 is a block diagram illustrating an example network system having a Domain Name System (DNS) server that determines a network device from a set of network devices that is preferable for offering a service to a client device of a set of client devices, in accordance with one or more techniques of this disclosure.

FIG. 1 is a block diagram illustrating an example network system 2 having a Domain Name System (DNS) server 20 that determines a network device from a set of network devices 30A-30N that is preferable for offering a service to a client device of a set of client devices 40A-40N, in accordance with one or more techniques of this disclosure. In the example of network system 2, a wide area network (WAN) 7 connects customer network 6 to DNS server 20. WAN 7 may be deployed by a service provider to enable network access for client devices 40A-40N (collectively, "client devices 40") such that the client devices may exchange data packets with any of network devices 30A-30N (collectively, "network devices 30") of network system 2.

In the example of FIG. 1, customer network 6 interfaces with client devices 40. A customer may include, for instance, an enterprise, a residential subscriber of a service provider, or a mobile subscriber of the service provider. Client devices 40 may be, for example, real or virtual servers, personal computers, laptop computers, smart phones, tablets, or other types of computing devices positioned behind network devices that may provide local routing and switching functions. Each of client devices 40 may run a variety of software applications, such as distributed applications, word processing and other office support software, web browsing software, software to support voice calls, video games, video conferencing, and email, among others. Client devices 40 may also be a variety of network-enabled devices, referred generally to as "Internet-of-Things" (IoT) devices, such as cameras, sensors, televisions, appliances, etc.

Customer network 6 aggregates data traffic for one or more of client devices 40 for transport to/from WAN 7. Customer network 6 includes network nodes that execute communication protocols to transport control and user data to facilitate communication between client devices 40 and network devices 30. Customer network 6 may include an enterprise network, a data center network, a home network, or other network. Customer network 6 may include a broadband access network, a wireless LAN, a public switched telephone network (PSTN), a customer premises equipment (CPE) network, or other type of access network, and may include or otherwise provide connectivity for cellular access networks, such as a radio access network (RAN) (not shown). Examples include networks conforming to a Universal Mobile Telecommunications System (UNITS) architecture, an evolution of UMTS referred to as Long Term Evolution (LTE), LTE Advanced (LTE-A), 5G, mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the WiMAX forum.

WAN 7 offers packet-based connectivity to client devices 40 for accessing DNS server 20. Additionally, WAN 7 offers packet-based connectivity to client devices 40 for accessing network devices 30. WAN 7 may represent a public network that is owned and operated by a service provider to interconnect a plurality of networks, which may include customer network 6 and a data center network of DNS server 20. WAN 7 may represent a layer three (L3) network and may include multiple intermediate routing and switching devices (not shown) that transport data traffic over links between destinations, such as between customer network 6 and DNS server 20 and between customer network 6 and one or more of network devices 30. As examples, WAN 7 may provide bulk data delivery, voice over Internet protocol (VOW), Internet Protocol television (IPTV), Short Messaging Service (SMS), Wireless Application Protocol (WAP) service, or customer-specific application services. In some examples, WAN 7 may represent a software-defined WAN ("SD-WAN") that utilizes, for example, the internet to connect customer network 6 and DNS server 20. An SD-WAN is a software-defined approach to managing the wide-area network. Although described in terms of WAN 7, one or more techniques of this disclosure are suitable for other types of networks that connect client devices to network devices.

A network service provider that administers at least parts of network system 2 typically offers network services to customers associated with devices, e.g., client devices 40, that access network system 2. As described above, WAN 7 may support multiple types of access network infrastructures that connect to service provider network access gateways to provide access to offered network services (e.g., services provided by network devices 30). In some instances, network system 2 may include client devices 40 that attach to multiple different customer networks 6 having varying architectures.

In general, any one or more of client devices 40 may execute an application, such as a distributed application, a client application, a web browser, or an email application, to access a service hosted on each of network devices 30. Services may include any application service, such as a website, a web application, a distributed application, a database service, or any combination hereof. In some examples, network devices 30 are web or application host servers of a data center. Each of network devices 30 may execute one or more virtual machines or containers that execute applications that provide services that may be requested by any of client devices 40. Each of network devices 30 may be a real or virtual server. The application or website hosted on network devices 30 may be provided as a service (e.g., Software as a Service (SaaS)) in which the provider hosts the application or website and provides access to the application service over the Internet. Additionally, in some examples, network devices 30 may provide Infrastructure-as-a-service (IaaS) and/or Platform-as-a-service (PaaS). For example, network device 30A may provide a service to a client device 40A by sending network traffic (e.g., packets) to client device 40A. Systems that use abstraction concepts such as IaaS, PaaS and SaaS, may create, leverage, and utilize many services. Such services may be deployed in a cloud which may add a new dimension to usage of network resources. Additionally, many of the services that are deployed within the cloud require a high amount of bandwidth. Many systems use TCP as a transport protocol. However, more servers residing in the cloud are moving towards MP-TCP.

Network traffic may flow between any combination of DNS server 20, network devices 30, and client devices 40 according to any one or more of a set of protocols. For example, network devices 30 may deliver services to client devices 40 according to any one or more of the set of protocols. The set of protocols may include Transmission Control Protocol (TCP), Multipath TCP. User Datagram Protocol (UDP), and other communication protocols. TCP facilitates reliable, ordered, and error-checked stream of data between a source host device and a destination host device (e.g., between client device 40A and network device 30A). Put another way, TCP may enable the source host device to transfer an ordered string of bits to the destination host device using a set of packets, where the set of packets may deliver the string of bits in order from a first bit to a last bit from the source host device to the destination host device. For example, a string of bits may include 100 bits. In such an example, the source host device may deliver the string of bits in a set of four packets, the first packet of the set of packets carrying the $1^{st}$ bit through the $25^{th}$ bit, the second packet of the set of packets carrying the $26^{th}$ bit through the $50^{th}$ bit, the third packet of the set of packets carrying the $51^{st}$ bit through the $75^{th}$ bit, and the fourth packet of the set of packets carrying the $76^{th}$ bit through the $100^{th}$ bit, thus completing the transfer of the 100-bit string. One or more techniques of this disclosure may use TCP to transfer a string of bits having any number of bits using a set of packets having any number of packets.

In some cases, it may be important for a destination host device (e.g., client device 40A) to arrange the bits of a string of bits in the correct order. For example, video data may include a string of bits, where the string of bits must be arranged in order so that the video data may be played from start to finish. A packet sent according to TCP may include data indicative of the position of the bits carried the packet within the ordered string of bits. In this way, the destination host device may be configured to "piece together" an ordered string of bits transmitted over a series of packets based on the respective position data included in the header of each packet such that the destination host device arranges the string of bits in the correct order. As such, TCP may be an ideal protocol for transferring an ordered string of bits from a source host device to a destination host device. Although TCP is highly effective for enabling data to be transferred from the source host device to the destination host device in a quick, efficient, and accurate manner, Multipath TCP (MP-TCP) may, in some cases, provide some advantages over "standard," single-path TCP in facilitating the flow of network traffic.

For example, MP-TCP is a protocol that adds new features to existing TCP. It allows TCP to use multiple parallel paths and create multiple TCP sub-flows underneath a single MP-TCP flow and allows distribution of data for load balancing and redundancy purposes over multiple TCP sub-flows. In other words, while TCP permits a destination host device and a source host device to exchange packets over a single "path," MP-TCP enables the destination host device and the source host device to establish two or more "paths" in which packets are exchanged between the destination host device and the source host device. In this way, an amount of time that it takes for the source host device to transfer a set of packets to the destination host device according to MP-TCP may be shorter than an amount of time that it takes for the source host device to transfer the set of packets to the destination host device according to standard, single-path TCP since packets of the set of packets may be transferred simultaneously over each path of the two or more paths established while using MP-TCP, Additionally, MP-TCP may increase a likelihood that packets of the set of packets arrive at the destination host device out of order. Since an MP-TCP packet header identifies the order of bits contained within the respective packet, the destination host device may piece together the set of packets such that the bits are arranged in the correct order for consumption.

Currently, DNS servers not described herein may not be aware of the MP-TCP capability of SaaS servers, hence once a client queries, such DNS servers may respond with their own choice of algorithm to provide a SaaS location to the requesting client. In cases where a client is capable of MP-TCP, the client may not be able to take an advantage from MP-TCP, since the server might or might not be MP-TCP capable. At least some techniques of this disclosure include a model where a DNS server (e.g., DNS server 20) can be aware of an MP-TCP capability of SaaS end points, cache information indicative of the MP-TCP capability locally, and respond to a requesting MP-TCP capable client. Additionally, enhancements to DNS to make DNS queries and DNS responses MP-TCP aware are described herein. For example, a method described herein may make DNS query and DNS response messages MP-TCP aware.

A case in which MP-TCP may be implemented may arise in a system in which a smartphone (e.g., client device 40B) exchanges network traffic with a remote server (e.g., network device 30A). The smartphone may be capable of communicating with the remote server over a 3G wireless connection and/or a WIFI connection. MP-TCP may enable the remote server and the smartphone to establish two paths: a first path between the smartphone and the remote server over the 3G connection and a second path between the smartphone and the remote server over the WWI connection. The remote server may transmit a set of packets according to MP-TCP simultaneously over both of the first path and the second path, whereas according to single-path TCP, the remote server might only be configured to transmit the set of packets over one of the first path and the second path.

DNS server 20 may represent a network device (e.g., a server) that is configured to receive DNS queries and identify, based on information in the DNS queries, one or more Internet Protocol (IP) addresses associated with one or more network devices (e.g., network devices 10). A DNS query may represent a packet having a set of information fields, where at least some information fields of the set of information fields include data that may be used by DNS server 20 to produce a DNS response to the DNS query, the DNS response including an indication of one or more IP addresses associated with the one or more network devices. For example, DNS server 20 may include a DNS resolver 22 and a memory 24. DNS resolver 22 may receive DNS queries and read the DNS queries to obtain the information included in the set of information fields. Based on the information included in the DNS queries, DNS resolver 22 may determine the IP addresses based on information stored in memory 24.

Memory 24 may be configured to store information within DNS server 20 during operation. Memory 24 may include a computer-readable storage medium or computer-readable storage device. In some examples, memory 24 includes one or more of a short-term memory or a long-term memory. Memory 24 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, memory 24 is used to store data indicative of instructions for execution by DNS server 20.

To access a service hosted on network devices 30, any of client devices 40 may make a request that necessitates a DNS lookup. For example, an application executed by client device 40A may send DNS query 50 to DNS server 20 to discover an IP address of a network device 30 hosting the service. In some examples, the DNS query 50 is a DNS message that indicates a hostname and/or domain name associated with at least some of network devices 30, and also includes an indication of a request for a network device of network devices 30 configured to operate according to MP-TCP. For example, DNS resolver 8 may receive, from client device 40A, DNS query 50 which includes an indication of a hostname and an indication of a request for a network device of network devices 30 configured to operate according to MP-TCP. The hostname is a label that is assigned to at least some network devices of network devices 30 which are connected WAN 7. In some examples, the hostname indicated in DNS query 50 is assigned to network device 30B, network device 30C, and network device 30D and the hostname indicated in DNS query 50 is not assigned to network device 30A and network devices 30E-30N. In some such examples, each of the network devices 30B-30D that are associated with the hostname indicated by DNS query 50 may be configured to provide substantially the same service to client device 40A. In this way, client device 40A may obtain the service by sending a service request to any of network devices 30B-30D. However, in some cases, at least one of network devices 30B-30D may be preferable for offering the service to client device 40A. For example, at least one network device of network devices 30B-30D may be configured to offer the service to client device 40A quicker, more efficiently, or in an otherwise more desirable manner than the other network devices of network devices 30B-30D. Each network device of network devices 30 may be associated with an IP address. As such, in some examples, a hostname may be associated with two or more IP addresses (e.g., associated with two or more network devices).

In some examples, it may be desirable for network devices 30 to provide services to client devices 40 according to the MP-TCP protocol. For example, in a typical deployment, an end client uses a domain name associated to one or more servers to connect to the one or more servers. DNS servers (e.g., DNS server 20) play a key role in providing an IP address associated with a respective server to a requesting client. For a client to gain enhanced bandwidth via an MP-TCP channel, both of the client and the server may need to be MP-TCP capable. In other words, to provide a service according to the MP-TCP protocol, both of the source host device (e.g., a network device 30) and the destination host device (e.g., a client device 40) may be MP-TCP capable. DNS resolver 22 may be configured to determine, based on the indication of the hostname and the indication of the request for the network device capability included in DNS query 50, that a network device of network devices 30 is preferable for offering the service to client device 40A.

DNS resolver 22 may be configured to identify a first set of network devices of network devices 30, where the first set of network devices is associated with the hostname. For example, DNS resolver 22 may maintain a list of network devices 30, and a list of hostnames that are associated with each network device of network devices 30. In this way, DNS resolver 22 may be configured to identify the first set of network devices which includes each network device of network devices 30 that is assigned to the hostname indicated in DNS query 50. In some examples, the first set of network devices includes network device 30B, network device 30C, and network device 30D. Additionally, DNS resolver 22 may be configured to identify a second set of network devices based on the indication of a request for a network device of network devices 30 configured to operate according to MP-TCP, where the second set of network devices is a subset of the first set of network devices. For example, DNS resolver 22 may be configured to identify whether each network device of network devices 30B-30D (i.e., the first set of network devices) is MP-TCP capable by mapping of network devices 30B-30D to a list of MP-TCP capable network devices stored in memory 24. Subsequently, DNS resolver 22 may determine, from at least one of the first set of network devices and the second set of network devices, the network device that is preferable for offering the service to client device 40A.

In some examples, the second set of network devices includes zero network devices. For example, if DNS query 50 includes an indication of a request for a network device that is MP-TCP capable, DNS resolver 22 might not identify any network devices of the first set of network devices (e.g., network devices 30B-30D) as being MP-TCP capable. In some such examples, DNS resolver 22 may determine, from the first set of network devices, the network device that is preferable for offering the service to client device 40A. Additionally, in some examples, the second set of network devices includes one or more network devices. For example, at least one of the first set of network devices is MP-TCP capable. In some such examples, DNS resolver 22 determines, from the second set of network devices, the network device that is preferable for offering the service to client device 40A. In some cases, the first set of network devices assigned to the hostname indicated in DNS query 50 includes network devices 30B, 30C, and 30D. In some cases, the second set of network devices that represents all network devices of the first set of network devices that are MP-TCP capable includes network device 30D. Thus, in such cases, the only network device of network devices 30 that is both assigned to the hostname and is capable of exchanging network traffic according to MP-TCP is network device 30D.

After determining that a network device of network devices 30 is preferable for offering a service to client device 40A, DNS resolver 22 may be configured to generate DNS response 52 in response to DNS query 50, DNS response 52 including an indication of an IP address corresponding to the network device (e.g., network device 30D) that is preferable for offering the service to client device 40A. Memory 24 may store a list of IP addresses corresponding to each of network devices 30. In this way, after DNS resolver 22 determines that network device 30D of network devices 30 is preferable for offering the service to client device 40A, DNS resolver 22 may look up the IP address corresponding to network device 30D in memory 24 in order to generate DNS response 52 including the indication of the IP address.

Subsequently, DNS resolver 22 may send DNS response 52 to client device 40A via WAN 7 and customer network 6. In turn, client device 40A may send a service request to network device 30D and network device 30D may provide the service to client device 40A via WAN 7 and customer network 6.

In some examples, to receive DNS query 50, DNS resolver 22 is configured to receive DNS query 50 according to User Datagram Protocol (UDP). Additionally, after generating DNS response 52, DNS resolver 22 is configured to determine a size of DNS response 52 and determine whether the size of DNS response 52 is greater than a threshold number of bytes. In some examples, DNS resolver 22 determines that the size of DNS response 52 is not greater than the threshold number of bytes and DNS resolver sends DNS response 52 to client device 40A according to UDR Additionally, in some examples, DNS resolver determines that DNS response 52 is greater than the threshold number of bytes, and DNS resolver 22 sends DNS response 52 to the client device according to TCP. In some examples, the threshold number of bytes is 512 bytes. UDP may be a preferred protocol for exchanging DNS queries and DNS responses, because it is faster and has lower overhead than TCP. For example, client device 40A may send a DNS query representing a UDP request which is followed by a DNS response representing a LTDP reply from DNS server 20. DNS server 20 may use TCP instead of UDP for sending the DNS response if the size of the DNS response is greater than the threshold number of bytes in order to enable data integrity checks that are included in the TCP protocol.

In some examples, an MP-TCP proxy (not illustrated in FIG. 1) may be connected to WAN 7, where the MP-TCP proxy relays DNS queries and DNS responses between client devices 40 and DNS server 20. Additionally, the MP-TCP proxy may relay network traffic between network devices 30 and client devices 40. Since DNS query 50 may include an indication of a request for an MP-TCP capable device corresponding to the hostname, and DNS response 52 may include an indication of whether one or more network devices associated with one or more IP addresses included in DNS response 52 are MP-TCP capable, the MP-TCP proxy may maintain MP-TCP links between one or more of network devices 30 and one or more of client devices 40. In other words, indications of the MP-TCP capability of client devices and network devices may obviate a need for the MP-TCP proxy to terminate one or more MP-TCP connections between network devices 30 and client devices 40. As such, including the indications of the MP-TCP capability of client devices and network devices may enhance a user experience by increasing an amount of bandwidth in connections between network devices 30 and client devices 40.

In some examples, a client (e.g., client device 40A) initiates a DNS query with MP-TCP options enabled in the message. A DNS resolver (e.g., DNS resolver 22) receives the DNS query. DNS resolver 22 maintains a list of servers (e.g., a list of network devices 30) associated with a domain name. This list of servers are created by existing methodology and there is no change proposed in this. The DNS resolver maintains the MP-TCP capability of each of the servers in a cache. In some examples, DNS name to server mapping is generated via configuration. At the same time the MP-TCP capability can be configured at the DNS resolver. Additionally, in some examples, in absence of the configuration, the resolver can choose to build a capability database dynamically via initiating a TCP syn with MP_TCP flag set in TCP options. If the server responds back with an MP-TCP capable flag, the DNS resolver can cache this information along with other data. This process of refreshing can be periodic/aging of the entry. The DNS resolver may check for an MP-TCP option in the DNS query. If the DNS query has MP-TCP options enabled, the DNS resolver may look for a list of servers mapped to the requested domain name which are MP TCP capable. Based on a successful finding of MP-TCP capable server IP address, the IP address may be sent as a primary IP address in the DNS response with MP-TCP options enabled. If there are multiple servers with NIP-TCP options are available, an existing policy of selection of a server from a list should be followed. If none of the available servers for a domain name are found to be MP-TCP capable, an existing model/policy/load balanced server should be selected and sent. After receiving the DNS response, the client initiates a connection to the primary server with MP-TCP options if required.

Figure 2:
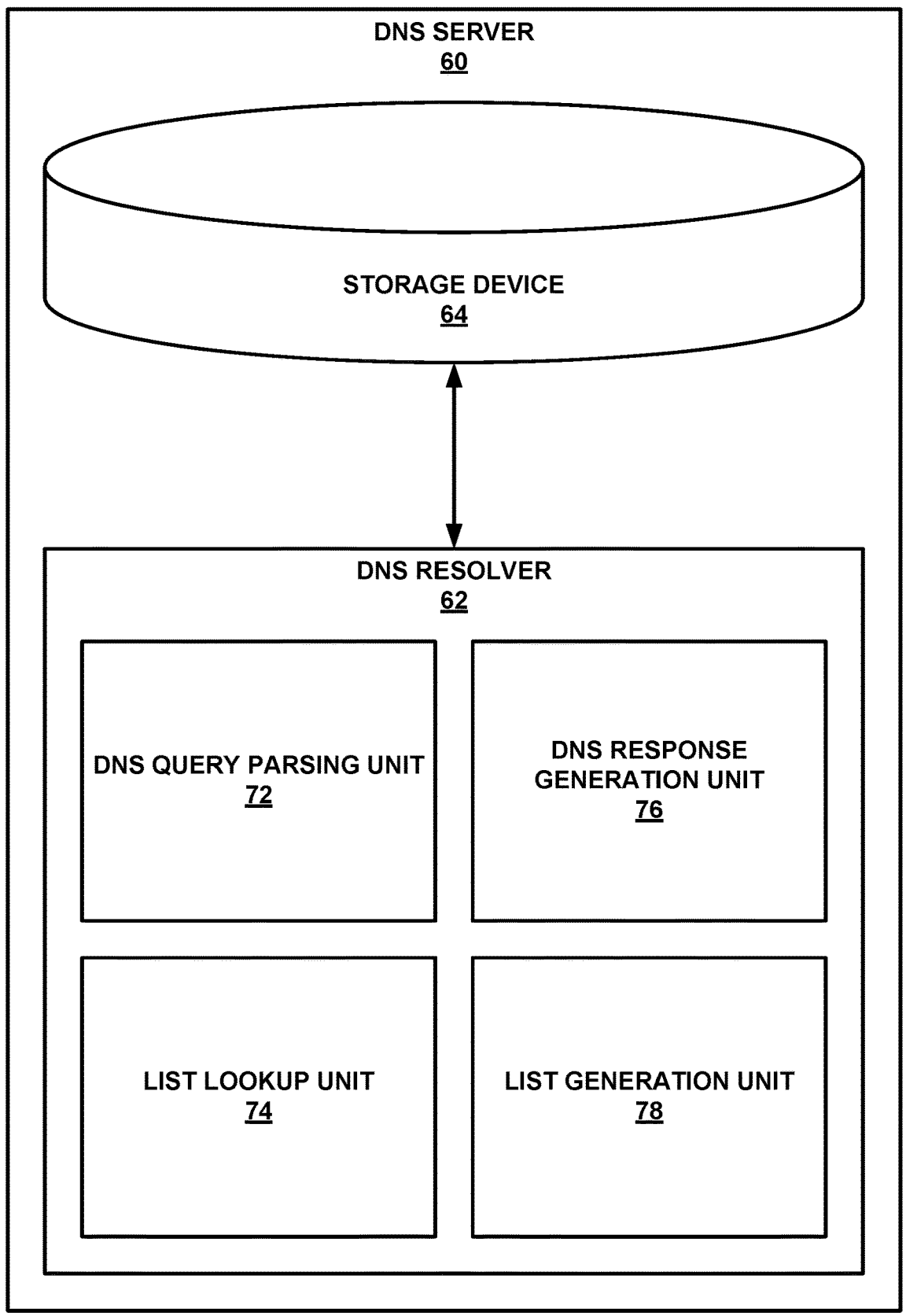
FIG. 2 is a block diagram illustrating an example DNS server including a DNS resolver and a memory, in accordance with one or more techniques of this disclosure.

FIG. 2 is a block diagram illustrating an example DNS server 60 including a DNS resolver 62 and a memory 64, in accordance with one or more techniques of this disclosure. In some examples, DNS server 60 is an example of DNS server 20 of FIG. 1. In some examples, DNS resolver 62 is an example of DNS resolver 22 of FIG. 1. In some examples, memory 64 is an example of memory 24 of FIG. 1. As seen in FIG. 2, DNS resolver 62 includes DNS query parsing unit 72, list lookup unit 74, DNS response generation unit 76, and list generation unit 78.

In some examples, DNS server 60 receives, from a client device (e.g., client device 40A of FIG. 1, a DNS query (e.g., DNS query 50 of FIG. 1) that includes an indication of a hostname and an indication of a request for a network device configured to operate according MP-TCP. DNS query parsing unit 72, in some cases, may be configured to parse DNS query 50 to determine the hostname and the capability of client device 40A that are indicated by DNS query 50. For example, DNS query parsing unit 72 may be configured to identify one or more information fields of DNS query 50, and identify which information fields of the one or more information fields include the indication of the hostname and the indication of the request for the network device configured to operate according to MP-TCP, respectively. Additionally, in some cases, DNS query parsing unit 72 may be configured to translate the respective information fields that include the indication of the hostname and the indication of the request from binary format to a non-binary format, enabling DNS server 60 to identify the hostname and the capability of client device 40A. DNS query parsing unit 72 may be configured to identify all information fields of the one or more information fields included in DNS query 50, and translate all binary data included in DNS query 50 to a binary format. For example, DNS query 50 may be sent by client device 40A according to UDP, and DNS query parsing unit 72 may identify the hostname and the capability of client device 40A based on one or more parameters of UDR In some examples, list lookup unit 74 may look up, in a list stored by memory 64, a first set of network devices associated with the hostname identified in DNS query 50. For example, the list may include each network device of network devices 30 of FIG. 1. Additionally, the list may include an indication of a hostname associated with each network device of network devices 30. As such, after DNS query parsing unit 72 determines the hostname identified in DNS query 50, list lookup unit 74 may cross-reference the hostname with the list of network devices 30 which includes the respective indications of a hostname associated with each network device of network devices 30 in order to identify the first set of network devices. In this way, list lookup unit 74 may identify each network device of network devices 30 that is associated with the hostname indicated in DNS query 50.

Additionally, in some examples, list lookup unit 74 may identify, in the first set of network devices, a second set of network devices based on the indication of a request for a network device of network devices 30 configured to operate according to MP-TCP. If client device 40A is capable of communicating according to MP-TCP, it may be beneficial for list lookup unit 74 to identify each network device of the first set of network devices that is capable of communicating according to MP-TCP. For example, when client device 40A sends a service request to a network device that is MP-TCP capable when client device 40A is also MP-TCP capable, the MP-TCP capable network device and client device 40A may establish an MP-TCP connection, enabling the MP-TCP capable network device to provide a service to client device 40A according to the MP-TCP protocol. In some examples, MP-TCP may be preferable to single-path TCP, since MP-TCP may provide a greater amount of bandwidth than single-path TCP, enabling transmission of network traffic to occur in a more efficient manner according to MP-TCP than according to single-path TCP. The list of network devices 30 included in memory 64 may include an indication of whether each network device of network devices 30 are capable of communicating according to MP-TCP. In this way, list lookup unit 74 may determine, based on the list of network devices 30 stored by memory 64, whether each network device of the first set of network devices is capable of communicating according to MP-TCP.

In some cases, DNS server 60 may be configured to determine that one or more network devices of the list of network devices 30 is preferable for offering a service to client device 40A. For example, DNS server may determine, from at least one of the first set of network devices and the second set of network devices, the one or more network devices of the list of network devices 30 that is preferable for offering the service to client device 40A. List lookup unit 74 may determine, based on the list of network devices 30 stored in memory 64 which includes an indication of an IP address associated with each network device of network devices 30, an IP address associated with each network device of the one or more network devices that DNS server 60 determines is preferable for offering the service to client device 40A. DNS response generation unit 76 may generate, based on the one or more network devices of the list of network devices 30 that is preferable for offering the service to client device 40A, a DNS response (e.g., DNS response 52 of FIG. 1). For example, DNS response generation unit 76 may generate DNS response 52 to include an indication of the IP address associated with each network device of the one or more network devices that DNS server 60 determines is preferable for offering the service to client device 40A. DNS response generation unit 76 may be configured to generate DNS response 52 which includes one or more information fields, including an information field which represents the respective IP addresses. After DNS response generation unit 76 generates DNS response 52, DNS server 60 may send DNS response 52 to client device 40A.

List generation unit 78 may generate and maintain the list of network devices 30 which includes an IP address associated with each network device of network devices 30, an indication of a hostname associated with each network device of network devices 30, and an indication of whether each network device of network devices 30 is capable of communicating according to MP-TCP. In some examples, list generation unit 78 may output a message to each network device of network devices 30, the message requesting a reply indicating whether the respective network device is MP-TCP capable. In some examples, DNS server 60 may receive a reply to the message, the reply indicating whether the respective network device is MP-TCP capable. Subsequently, list generation unit 78 may make a record in the list of network devices 30 stored in memory 64 reflecting the indication included in the response to the message. Additionally, in some cases, list generation unit 78 may be configured to output messages to determine an IP address and/or a host name associated with each network device of network devices 30 so that list generation unit 78 may make records in the list of network devices 30 stored by memory 64 reflecting the hostname and/or the IP address associated with each network device of network devices 30.

Memory 64 may be configured to store information within DNS server 60 during operation. Memory 64 may include a computer-readable storage medium or computer-readable storage device. In some examples, memory 64 includes one or more of a short-term memory or a long-term memory. Memory 64 may include, for example, RAM, DRAM, SRAM, magnetic discs, optical discs, flash memories, or forms of EPROM or EEPROM. In some examples, memory 64 is used to store data indicative of instructions for execution by DNS server 60.

Figure 3A:
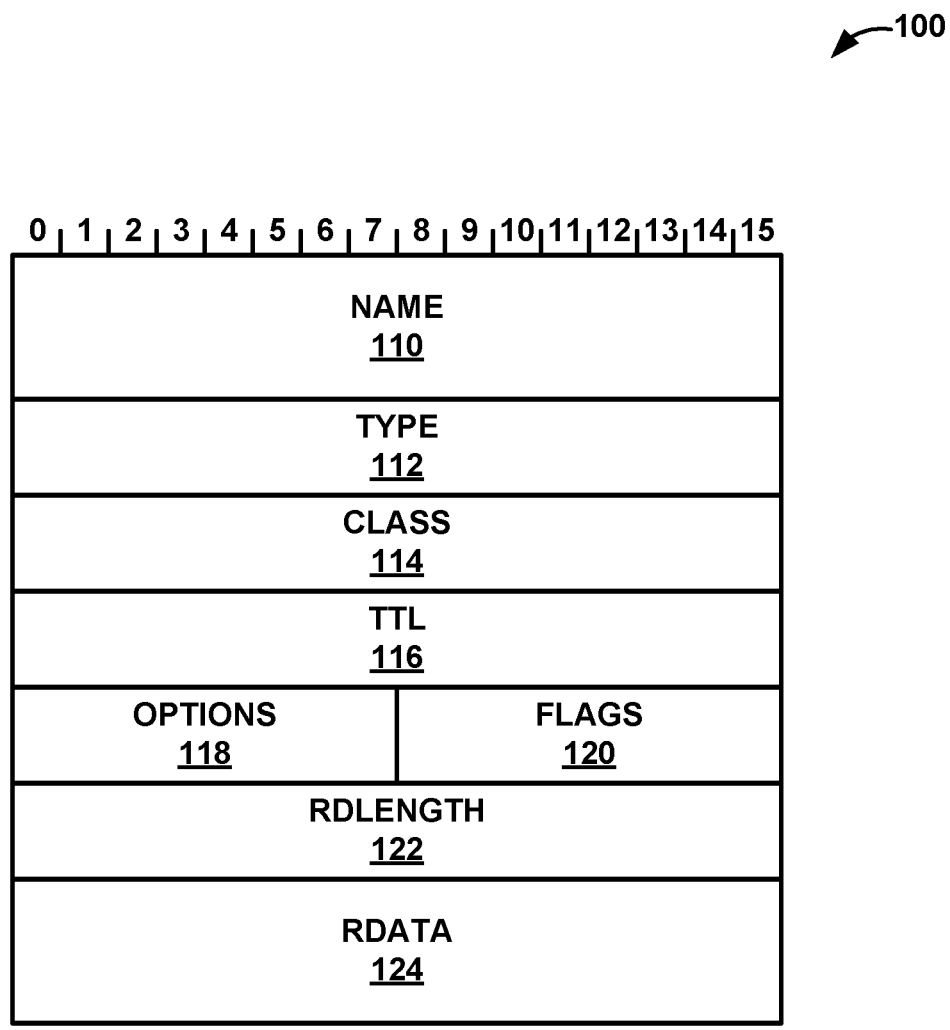
FIG. 3A is an example of a DNS query for requesting an Internet Protocol (IP) address corresponding to a network device for providing a service to a client device, in accordance with one or more techniques of this disclosure.

FIG. 3A is an example of a DNS query 100 for requesting an IP address corresponding to a network device for providing a service to a client device, in accordance with one or more techniques of this disclosure. In some examples, DNS query 100 is an example of DNS query 50 of FIG. 1. Additionally, in some examples, DNS query 100 is an example of another DNS query not illustrated in FIG. 1. As illustrated in FIG. 3A, DNS query complies with UDP and TCP in that DNS query 100 includes a set of rows each having 16 bits (i.e., bits 0-15).

DNS query 100 may represent a DNS message for requesting one or more IP addresses associated with a network device. For example, a client device (e.g., client device 40A) may generate DNS query 100 based on a user input to access a website having a hostname, where the website is hosted by one or more network devices of network devices 10. For example, client device 40A may receive user input indicative of a hostname (e.g., a manual input of a Uniform Resource Locator (URL)), where one or more IP addresses associated with a set of network devices corresponding to the hostname might not be stored by or otherwise available to client device 40A. As such, in order to obtain the one or more IP addresses associated with the set of network devices, client device 40A may generate DNS query 100 and send DNS query 100 to DNS server 20 via customer network 6 and WAN 7. DNS server 20, in some cases, may be configured to look up the one or more IP addresses associated with the set of network devices.

DNS query 100 represents a series of bits. Each bit of the series of bits is a binary value. For example, each bit may be a "0" or a "1." In this way, the information contained within DNS query 100 is represented in binary format (i.e., only 0 s and 1 s), rather than an English format in which phonetic characters are used. DNS query 100 may include a set of information fields including name 110, type 112, class 114, Time To Live (TTL) 116, options 118, flags 120, RDLENGTH 122, and RDATA 124. Each field of the set of information fields contains data that may be used by DNS server 20 to process DNS query 100. For example, name 110 may include an indication of the hostname to be queried using DNS query 100. In other words, name 110 may include a binary representation of the hostname, enabling DNS resolver 22 to look up the one or more IP addresses that are associated with the set of network devices corresponding to the hostname. In some examples, DNS resolver 22 looks up the one or more IP addresses in memory 24 which may include a list of network devices 30 and a list of IP addresses, where an IP address of the list of IP addresses is associated with each network device of the list of network devices 10. In this way, DNS resolver 22 may be configured to map each of network devices 30 to a respective IP address.

Type 112 may, in some cases, represent a two-octet (e.g., one row of 16 bits) code which specifies a type of query represented by DNS query 100. Example query types include type A (Type ID 1) which returns a 32-bit IPv4 address and type AAAA (type ID 28) which returns a 128-bit IPv6 address. In some examples, the type ID corresponding to the respective query type of DNS query 100 may be coded in the type 112 information field in binary format. For example, the type ID '28' may be coded in ASCII Binary format within the 16-bit type 112 information field as "0011001000111000," a 16-bit string of 0 s and is. DNS server 20 may process DNS query 100 based on the query type indicated in the type 112 information field. For example, DNS resolver 22 may determine, based on the query type indicated in the type 112 information field of DNS query 100, that client device 40A requests an IP address corresponding to the hostname indicated in the name 110 information field. Class 114 may represent a two-octet code which specifies a class of query represented by DNS query 100. In some examples, class 114 may include the binary string "0000000000000001," which indicates that DNS query is of the "Internet Addresses" class. Additionally, DNS query 100 includes a TTL 116 information field. In some examples, TTL 116 may be a 16-bit field that indicates a number of seconds that DNS query 100 remains active. For example, after the number of seconds indicated by the TTL 116 information field elapses, DNS query 100 may be invalidated.

Options 118, in some cases, represent an 8-bit information field. Options 118 may include an indication of a request for a network device of network devices 30 configured to operate according to MP-TCP. A device that is capable of to operating according to MP-TCP may be configured to output network traffic according to MP-TCP and receive network traffic according to MP-TCP. The indication of the request for a network device of network devices 30 configured to operate according to MP-TCP may be represented, in some examples, by a single bit (e.g., "0" if client device 40A is not MP-TCP capable and "1" if client device 40A is MP-TCP capable). In this manner, when client device 40A generates DNS query 100, client device 40A may set bit-0 (that is, the ordinal first bit) of the options 118 information field to either '0' or '1' depending on whether client device 40A is MP-TCP capable. The rest of the bits of options 118 that do not include the indication of MP-TCP capability, in some cases, may include other indications or other information corresponding to client device 40A. Additionally, flags 120 may include other indications or other information corresponding to client device 40A. RDLENGTH 122 may include a number representing a length in bits of RDATA 124, where RDATA 124 includes additional binary data describing a resource corresponding to name field 110.

Figure 3B:
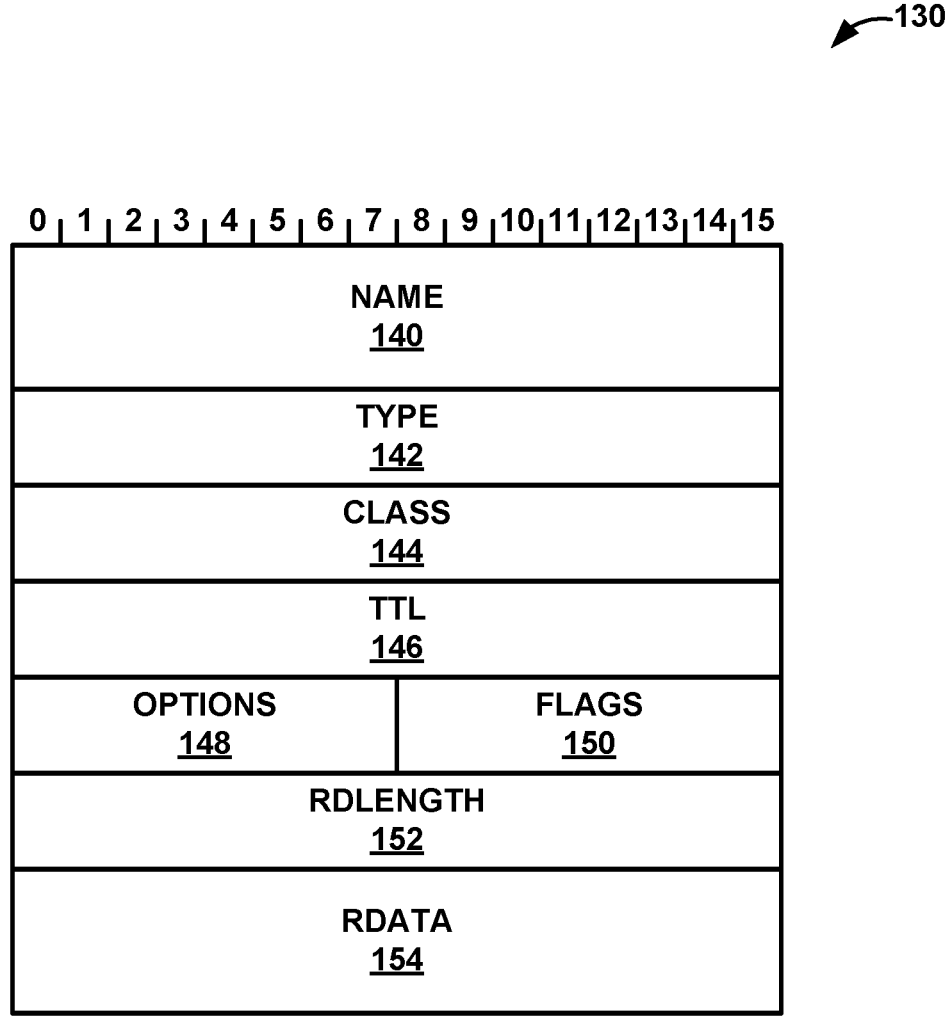
FIG. 3B is an example of a DNS response for providing an IP address corresponding to a network device for providing a service to a client device, in accordance with one or more techniques of this disclosure.

FIG. 3B is an example of a DNS response 130 for providing an IP address corresponding to a network device for providing a service to a client device, in accordance with one or more techniques of this disclosure. In some examples, DNS response 130 is an example of DNS response 52 of FIG. 1. Additionally, in some examples, DNS response 130 is an example of another DNS response not illustrated in FIG. 1. As illustrated in FIG. 3B, DNS response complies with UDP and TCP in that DNS query 100 includes a set of rows each having 16 bits (i.e., bits 0-15).

DNS response 130 may represent a DNS message for providing one or more IP addresses associated with a network device. For example, a DNS server (e.g., DNS server 20) may generate DNS response 130 in response to receiving a DNS query (e.g., DNS query 100) requesting the one or more IP addresses associated with the network device. For example, the DNS query may include an indication of a hostname and an indication of a request for a network device of network devices 30 configured to operate according to MP-TCP. Based on the indication of the hostname and the indication of the request, DNS resolver 22 may determine that a network device of network devices 10 is preferable for offering a service to the client device. Additionally, DNS resolver 22 may identify an IP address associated with the network device that is preferable for offering the service to the client device, and generate DNS response 130, which includes an indication of the IP address. DNS server 20 may send, via customer network 6 and WAN 7, DNS response 130 to the client device (e.g., client device 40A) which sent the DNS query prompting DNS server 20 to generate DNS response 130.

DNS response 130 represents a series of bits. Each bit of the series of bits is a binary value. For example, each bit may be a "0" or a "1." In this way, the information contained within DNS response 130 is represented in binary format (i.e., only 0 s and 1 s), rather than an English format in which phonetic characters are used. DNS response 130 may include a set of information fields including name 140, type 142, class 144. Time To Live (TTL) 146, options 148, flags 150, RDLENGTH 152, and RDATA 154. Each field of the set of information fields contains data that may be used by client device 40A to process DNS response 130. For example, the name 140 information field may include a binary representation of the hostname included in the DNS query (e.g., DNS query 100) prompting DNS server 20 to generate DNS response 130. Name 140 may include at least some of the data that is included in the name 110 information field of DNS query 100. As such, when client device 40A receives DNS response 130, the name 140 information field may enable client device 40A to confirm that DNS response 130 includes an indication of an IP address associated with a network device corresponding to the hostname indicated in DNS query 100 (e.g., confirm that DNS resolver 22 identified an IP address associated with the correct hostname).

Type 142 may, in some cases, represent a two-octet (e.g., one row of 16 bits) code which specifies a type of data included in the RDATA 154 information field. Example data types include type A (Type ID 1) which represents a 32-bit IPv4 address and type AAAA (type ID 28) which represents a 128-bit IPv6 address. In some examples, the type ID corresponding to the respective data type may be coded in the type 142 information field in binary format. For example, the type ID '1' may be coded in ASCII Binary format within the 16-bit type 112 information field as "0000000000000001," and the type ID '28' may be coded in ASCII Binary format within the type 112 information field as "0011001000111000." Client device 40A may process DNS response 130 based on the data type indicated in the type 142 information field. For example, client device 40A may determine, based on the data type indicated in the type 142 information field, that DNS response 130 includes one or more IP addresses. Class 144 may represent a two-octet code which specifies a class of data included in the RDATA 154 information field. In some examples, class 114 may include the binary string "0000000000000001," which indicates that the data included in RDATA 154 is of the "Internet Addresses" class. Additionally, DNS response 130 includes a TTL 146 information field. In some examples, TTL 146 may be a 16-bit field that indicates a number of seconds that DNS response 130 remains active. For example, after the number of seconds indicated by the TTL 146 information field elapses, DNS response 130 may be invalidated.

Options 148, in some cases, represent an 8-bit information field. Options 148 may include an indication of whether the network device associated with each IP address of the one or more IP addresses indicated in RDATA 154 is MP-TCP capable. For example, if RDATA 154 includes one IP address, bit-1 of the options 148 information field may represent the indication of whether the network device associated with the IP address is MP-TCP capable. The indication may be represented, in some examples, by a single bit (e.g., "0" if the network device is not MP-TCP capable and "1" if the network device is MP-TCP capable). In this manner, client device 40A may process DNS response 130 to determine whether client device 40A may exchange network traffic (e.g., receive the service) with the network device according to the MP-TCP protocol. In some examples, bit-0 of the options 148 information field may include the indication of a request for a network device of network devices 30 configured to operate according to MP-TCP that is included in the options 118 information field of DNS query 100. In this manner, the options 148 information field may enable client device 40A to confirm that DNS response 130 includes the indication of the request (e.g., confirm that DNS resolver 22 identified an IP address based on the correct indication of the request). The rest of the bits of options 148 that do not include indications of MP-TCP capability, in some cases, may include other indications or other information corresponding to client device 40A and/or DNS server 20. Additionally, flags 150 may include other indications or other information corresponding to client device 40A and/or DNS server 20.

RDLENGTH 152 may represent a 16-bit information field which indicates a length in bits of the RDATA 154 information field. RDATA 154 may include the one or more IP addresses corresponding to one or more respective network devices determined by DNS resolver 22 to be preferable for offering a service to client device 40A. DNS resolver 22 may determine the one or more IP addresses based on the indication of the hostname and the indication of the request for a network device of network devices 30 configured to operate according to MP-TCP included in DNS query 100. For example, if options 118 of DNS query 100 indicates that client device 40A is MP-TCP capable, DNS resolver 22 may look up a network device that is both associated with the hostname indicated in name 110 of DNS query 100 and MP-TCP capable. Memory 24 may store a list of network devices 10, where the list indicates a hostname associated with each network device of network devices 10, where the list indicates whether each network device of network devices 10 is MP-TCP capable, and where the list indicates an IP address corresponding to each network device of network devices 10. As such, DNS resolver may generate DNS response 130 including the IP address associated with the network device based on the indication of the hostname and the indication of the request for a network device of network devices 30 configured to operate according to MP-TCP included in DNS query 100.

Figure 4:
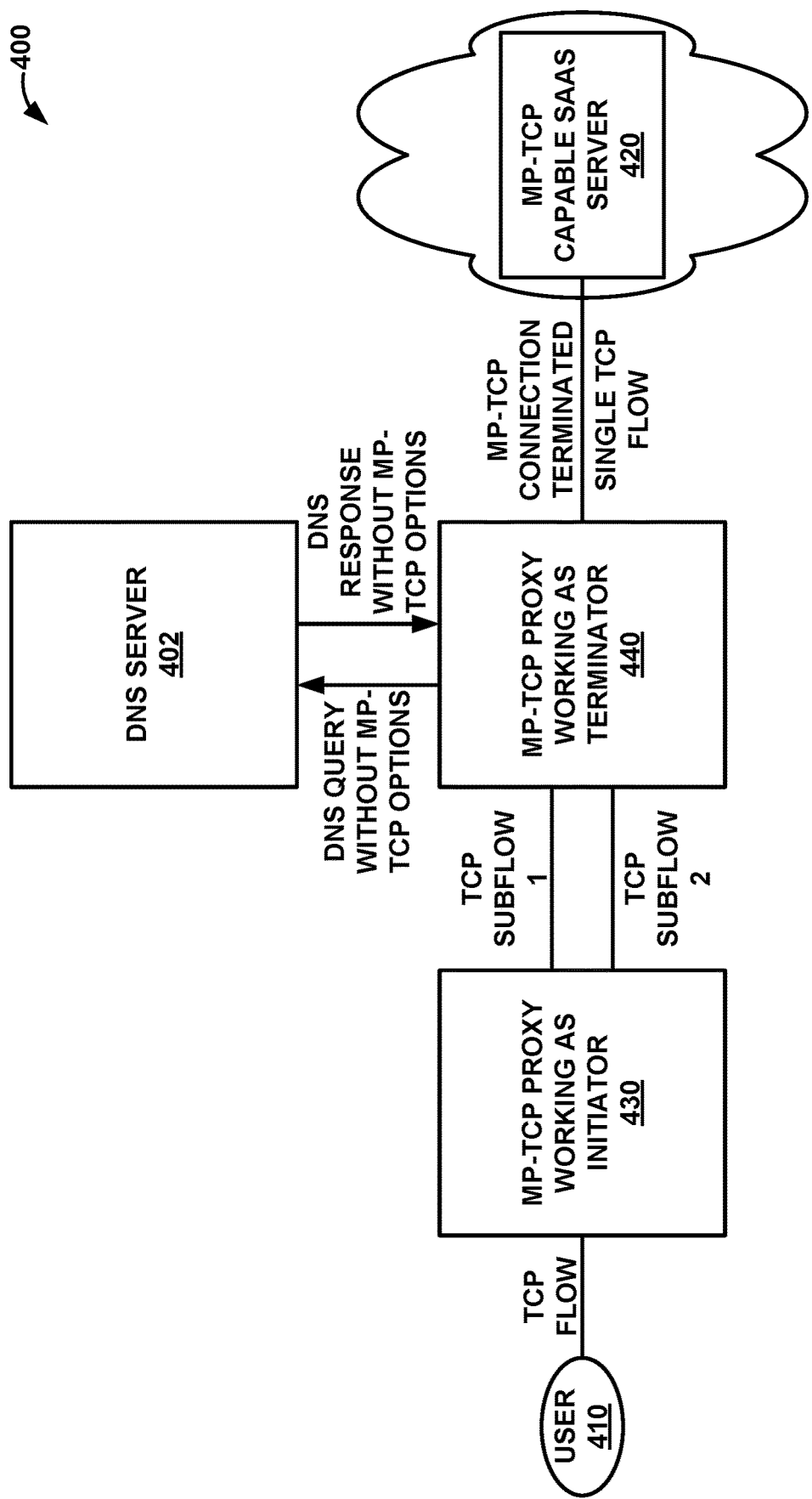
FIG. 4 is a block diagram illustrating an example system for facilitating a connection between a user and a Software-as-a-Service (SaaS) server.

FIG. 4 is a block diagram illustrating an example system 400 for facilitating a connection between a user and a SaaS server. As seen in FIG. 4, system 400 includes DNS server 402, user 410, MP-TCP capable SaaS server 420, MP-TCP Proxy working as initiator 430, and MP-TCP Proxy working as terminator 440. DNS server 402 may be an example of DNS server 20 of FIG. 1. User 410 may be a user associated with a client device of client devices 40 of FIG. 1. Additionally, in some examples, MP-TCP capable SaaS server 420 may be an example of a network device of network devices 30 of FIG. 1.

As MP-TCP usage becomes more common, devices acting as MP-TCP Proxies will also be used more. For example, the MP-TCP proxy may terminate an MP-TCP connection and create a single-path TCP connection and MP-TCP Proxy working as terminator 440 may represent an MP-TCP proxy which facilitates a connection between user 410 and MP-TCP capable SaaS server 420. In some examples where an endpoint (e.g., an internet web server) itself is MP-TCP capable, the MP-TCP proxy may terminate an MP-TCP connection and create a single-path TCP connection. For example, if a DNS query sent by user 410 does not include a request to know the MP-TCP capability of MP-TCP capable SaaS server 420, or if a DNS response sent by DNS server 402 does not include an indication that SaaS server 420 is MP-TCP capable, MP-TCP Proxy working as terminator 440 may terminate an MP-TCP connection between user 410 and SaaS server 420.

Figure 5:
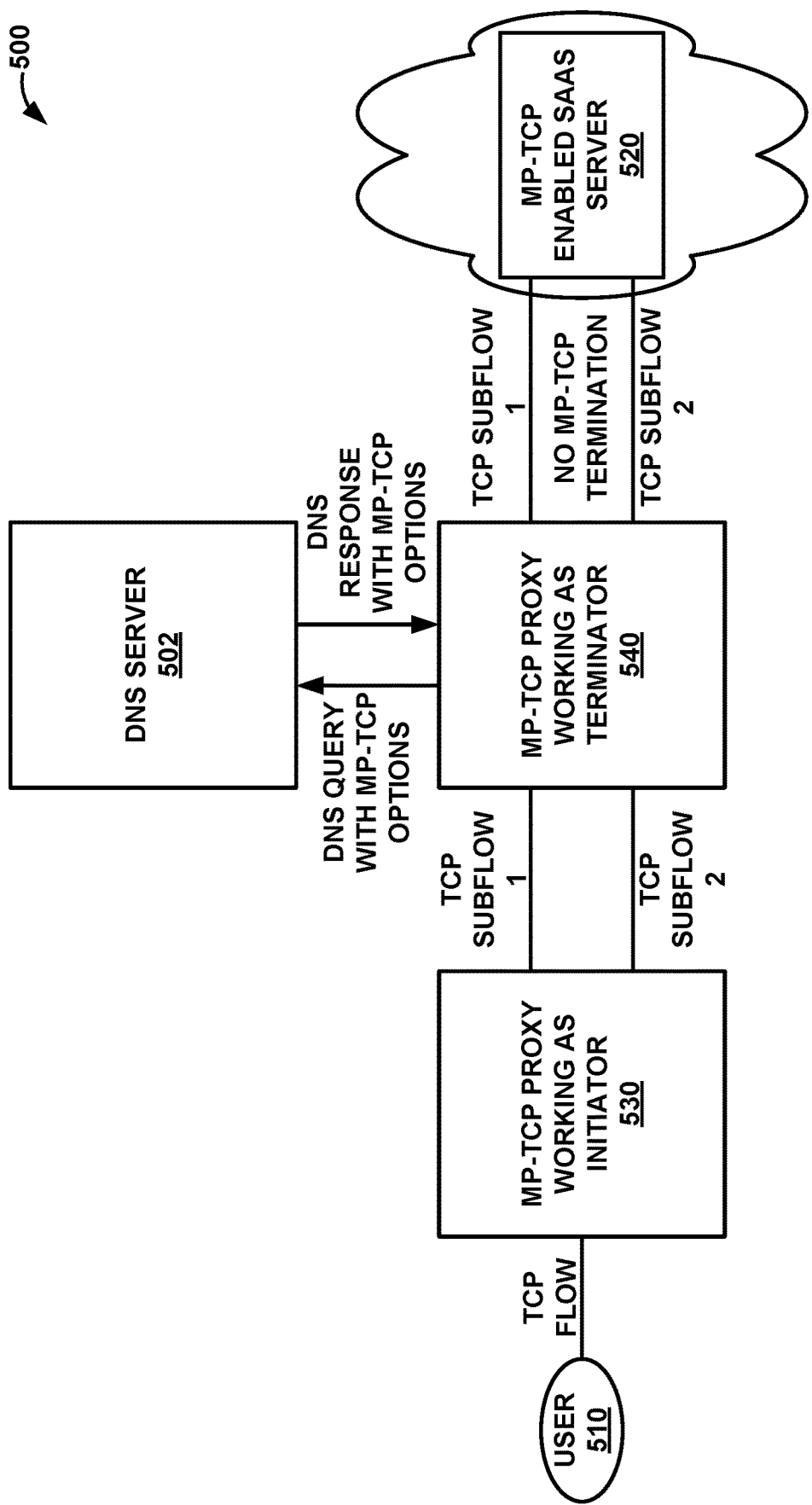
FIG. 5 is a block diagram illustrating another example system for facilitating a connection between a user and a SaaS server.

FIG. 5 is a block diagram illustrating another example system 500 for facilitating a connection between a user and a SaaS server. As seen in FIG. 5, system 500 includes DNS server 502, user 510, MP-TCP capable SaaS server 520, MP-TCP Proxy working as initiator 530, and MP-TCP Proxy working as terminator 540. DNS server 502 may be an example of DNS server 20 of FIG. 1. User 510 may be a user associated with a client device of client devices 40 of FIG. 1. Additionally, in some examples, MP-TCP capable SaaS server 520 may be an example of a network device of network devices 30 of FIG. 1.

In the example of HG. 5, user 510 is configured to send a DNS query to DNS server 502, where the DNS query includes an options information field including a request for an IP address corresponding to a server having MP-TCP capability. Additionally, a DNS response sent by DNS server 502 may include an options information field indicating an MP-TCAP capability of a server associated with an IP address requested in the DNS query. In this way, based on the DNS response which includes the indication of the MP-TCP capability, MP-TCP Proxy working as terminator 540 is configured to terminate or not terminate an MP-TCP connection between user 510 and MP-TCP capable SaaS server 520. In some examples, the MP-TCP Proxy may query DNS server 502 to determine the MP-TCP capability SaaS server 520. The MP-TCP Proxy may query DNS server 502 to determine the MP-TCP capability SaaS server 520 one time while performing a three-way handshake for establishing an MP-TCP connection. If the MP-TCP options are not included in the DNS query and the DNS response (as seen in FIG. 4), the MP-TCP proxy connection May be terminated before the application of SaaS server 520. Additionally, after the extension of the capability exchange, the MP-TCP Proxy working as initiator 530 may use the DNS MP-TCP capability option to decide whether to allow TCP sub-flows or not allow TCP sub-flows, as shown in FIG. 5. This may increase an end user experience and improve utilization of bandwidth.

Figure 6:
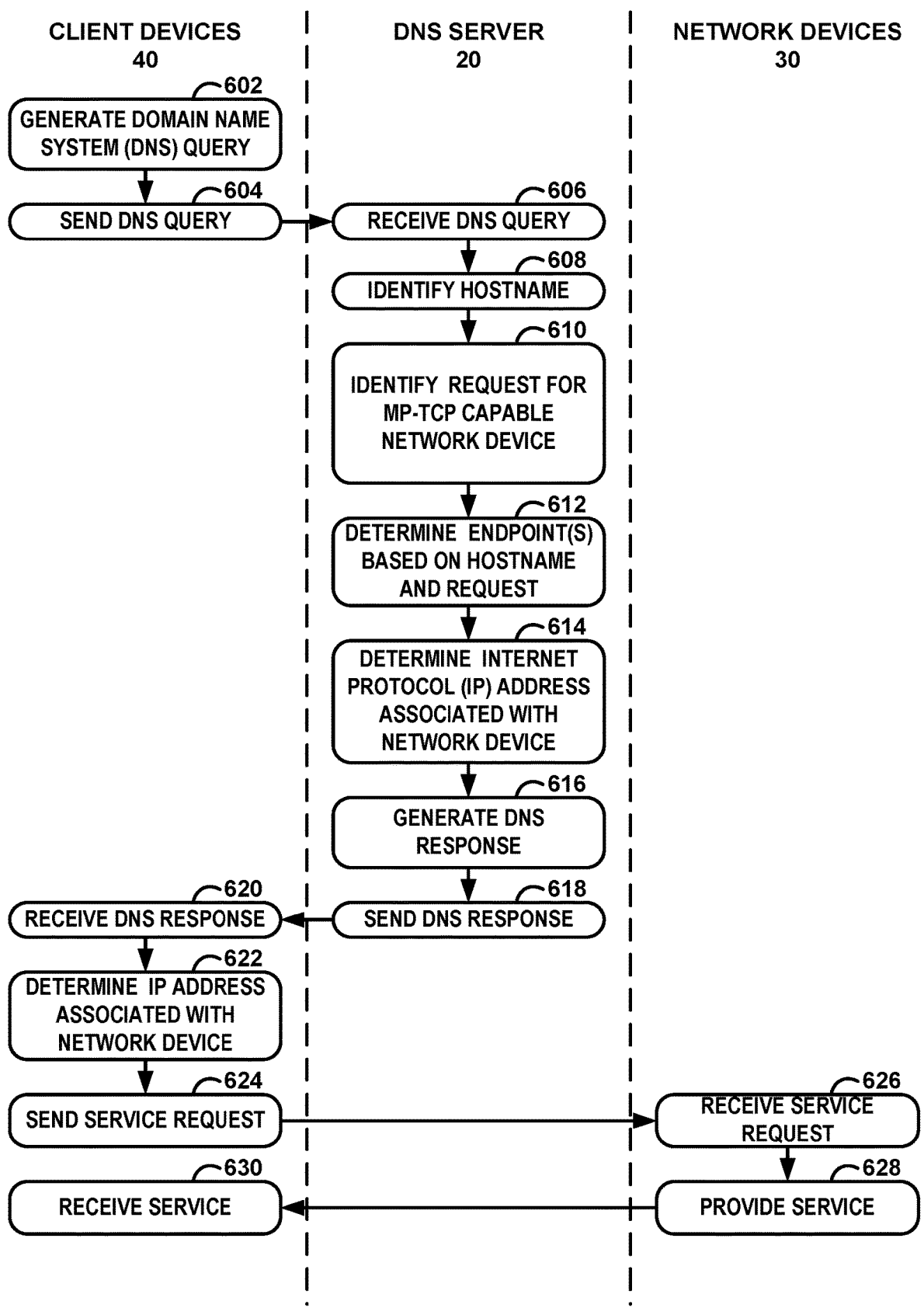
FIG. 6 is a flow diagram illustrating an example operation for determining an IP address associated with a network device for offering a service to a client device, in accordance with one or more techniques of this disclosure.

FIG. 6 is a flow diagram illustrating an example operation for determining an IP address associated with a network device for offering a service to a client device, in accordance with one or more techniques of this disclosure. For convenience, FIG. 7 is described with respect to DNS server 20, network devices 30, and client devices 40 of FIG. 1. However, the techniques of FIG. 6 may be performed by different components of DNS server 20, network devices 30, and client devices 40 or by additional or alternative devices.

A client device (e.g., client device 40A) of client devices 40 may receive one or more services from network devices 30. For example, network devices 30 may represent network devices (e.g., servers) that store data, applications, and services for consumption by client devices 40 and/or other devices not illustrated in FIG. 1. Client devices 40 may receive services from network devices 30 by sending service requests to network devices 30 via customer network 6 and WAN 7. For example, client device 40A may send a service request to one or more network devices of network devices 30, prompting the one or more network devices to provide a service to client device 40A. In some examples, to send a service request to the one or more network devices, client device 40A may send the service request to respective IP addresses associated with each network device of the one or more network devices. In some cases, client device 40A might not maintain a list of IP addresses corresponding to each network device of network devices 30. As such, to obtain one or more IP addresses for sending a service request to network devices 30, client device 40A may generate and send a DNS query to DNS server 20. In turn, DNS server 20 may generate and send a DNS response to client device 404 indicating the respective one or more IP addresses.

As illustrated in FIG. 6, a client device (e.g., client device 40A) of client devices 40 generates a DNS query (602) (e.g., DNS query 50). In some examples, client device 40A generates DNS query 50 to include an indication of a hostname and an indication of a request for an MP-TCP capable network device corresponding to the hostname. The hostname, in some cases, is associated with a set of network devices of network devices 30, where each network device of the set of network devices is controlled by a common host. By including the indication of the hostname when generating DNS query 50, client device 40A may direct DNS server 20 to retrieve IP addresses which enable client device 40A to receive service from the host associated with the hostname. Additionally, the indication of the request for an NIP-TCP capable network device corresponding to the hostname may represent an indication of whether DNS server 20 attempts to retrieve IP addresses corresponding to network devices that are MP-TCP capable. For example, it may be beneficial for network devices 30 to provide service to client devices 40 according to the MP-TCP protocol. In order for a network device (e.g., network device 30D) to provide service to a client device (e.g., client device 40A) according to the MP-TCP protocol, both of network device 30D and client device 40A may be configured to communicate according to the MP-TCP protocol. As such, it may beneficial for DNS query 50 to include the indication of the request for an MP-TCP capable network device so that DNS server 20 can facilitate an MP-TCP connection between one or more of network devices 30 and client device 40A.

Client device 40A sends DNS query 50 (604) to DNS server 20 via customer network 6 and WAN 7. DNS server 20 receives DNS query 50 (606). Subsequently, DNS resolver 22 identifies a hostname (608) based on DNS query 50. For example, DNS resolver 22 may be configured to read a header of DNS query 50, where the header includes an information field including an indication of the hostname. In some examples, the indication of the hostname is represented in binary format (e.g., a string of 1 s and 1 s), where DNS resolver 22 is configured to obtain the hostname from the binary representation of the hostname, Additionally, DNS resolver 22 is configured to identify a request for an MP-TCP capable network device (610). The header of DNS query 50 may include an options information field which includes a single bit representing the indication of the request for an MP-TCP capable network device corresponding to the hostname.

DNS resolver 22 may determine a network device of network devices 30 based on the hostname and the indication of the request for an MP-TCP capable network device (612) of client device 40A. For example, DNS resolver 22 may maintain a list of network devices 30 in memory 24, where each network device of the list of network devices 30 is associated with a hostname, and where each network device of the list of network devices 30 is associated with an indication of whether the respective network device is capable of communicating according to MP-TCP. In this way, DNS resolver 22 may be configured to identify, in the list of network devices 30, a first set of network devices that are associated with the hostname indicated by the DNS query 50. In other words, DNS resolver 22 may be configured to map the hostname indicated by DNS query 50 to the list of network devices 30 stored in memory 24, where the list includes an association between each network device of the list of network devices 30 with a respective hostname. In this way, the first set of network devices identified by DNS resolver 22 may include each network device of network devices 30 that is associated with the hostname. Additionally, DNS resolver 22 may be configured to identify a second set of network devices based on the indication of the request for the MP-TCP capable network device. For example, if DNS query 50 indicates that client device 40A is MP-TCP capable, DNS resolver 22 may determine, based on the list of network devices 30 stored in memory 24, the second set of network devices, where the second set of network devices represents each network device of the first set of network devices that is MP-TCP capable. As such, in some examples, DNS resolver 22 is configured to identify the second set of network devices as including each network device of network devices 30 that is both associated with the hostname and MP-TCP capable.

In some examples, the second set of network devices includes zero network devices, meaning that no network devices of the first set of network devices associated with the hostname indicated by DNS query 50 are MP-TCP capable. Additionally, in some examples, the second set of network devices includes one or more network devices, meaning that at least one network device of the first set of network devices is MP-TCP capable. Each network device of the list of network devices 30 stored in memory 24 may be associated with an IP address, where the list of network devices 30 includes the association between each network device of network devices 30 and the respective IP address. Based on at least one of the first set of network devices and the second set of network devices, DNS resolver 22 is configured to determine an IP address corresponding to each network device of the at least one of the first set of network devices and the second set of network devices (614). In examples where the second set of network devices includes one or more network devices, DNS resolver 22 is configured to determine an IP address corresponding to each network device of the second set of network devices. In examples where the second set of network devices includes zero network devices, DNS resolver 22 is configured to determine an IP address corresponding to at least one of the first set of network devices. DNS resolver 22 generates a DNS response (616), such as DNS response 52. DNS response 52 may include an indication of one or more IP addresses determined at block 614. In examples where the second set of network devices includes one or more network devices, DNS resolver 22 is configured to generate DNS response 52 to include an indication of at least one IP address associated with at least one network device of the second set of network devices. In some such examples, DNS resolver 22 is configured to generate DNS response 52 to include an indication of the IP address corresponding to each network device of the second set of network devices. Additionally, in some such examples, DNS resolver 22 is configured to generate DNS response 52 to include an indication of the IP address corresponding to one network device of the second set of network devices, where DNS resolver 22 determines that the one network device of the second set of network devices is the most desirable network device of the second set of network devices for providing a service to client device 40A. In examples where the second set of network devices includes zero network devices, DNS resolver 22 is configured to generate DNS response 52 to include an indication of at least one IP address associated with at least one network device of the first set of network devices. In some such examples, DNS resolver 22 is configured to generate DNS response 52 to include an indication of the IP address corresponding to each network device of the first set of network devices. Additionally, in some such examples, DNS resolver 22 is configured to generate DNS response 52 to include an indication of the IP address corresponding to one network device of the first set of network devices, where DNS resolver 22 determines that the one network device of the first set of network devices is the most desirable network device of the first set of network devices for providing a service to client device 40A.

DNS server 20 sends DNS response 52 to client device 40A via customer network 6 and WAN 7 (618). Client device 40A receives DNS response 52 (620). Subsequently, client device 40A reads the header of DNS response 52 to determine one or more IP addresses associated with the one or more network devices (622) determined by DNS resolver 22 to be preferable for offering a service to client device 40A. For example, DNS response 52 may include an indication of an IP address associated with network device 30D. Subsequently, client device 40A sends a service request (624) to network device 30D using the IP address indicated by DNS response 52. Network device 301) receives the service request (626) and provides the service (628) to client device 40A. Client device 40A receives the service (630). In examples where both client device 40A and network device 301) are MP-TCP capable, client device 40A may receive the service according to the MP-TCP protocol, which may be preferable to the single-path TCP protocol since network device 30D is configured to send network traffic (e.g., packets) to client device 40A over two or more paths while operating according to MP-TCP.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium including instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may include a computer data storage medium such as RAM, read-only memory (ROM), non-volatile random access memory (NVRAM), EEPROM, Flash memory, magnetic or optical data storage media, and the like. In some examples, an article of manufacture may include one or more computer-readable storage media.

In some examples, the computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:
1. A domain name system (DNS) device comprising:
a memory configured to store a list of Internet protocol (IP) addresses for a set of hostnames, at least one of the hostnames having two or more IP addresses including a first IP address and a second IP address, the memory further storing data representing, for each IP address of the IP addresses, whether a network device corresponding to an IP address of the IP addresses is capable of performing multipath transmission control protocol (MP-TCP), the network device being part of a set of network devices, the data for the at least one of the hostnames having the two or more IP addresses indicating that a first network device corresponding to the first IP address is capable of performing MP-TCP and that a second network device corresponding to the second IP address is not capable of performing MP-TCP; and
one or more processors implemented in circuitry and configured to:
receive, from a client device, a DNS query including a specification of a hostname and a request that a DNS response include one of the IP addresses of the list of IP addresses, the one of the IP addresses corresponding to the hostname and corresponding to one of the network devices that is MP-TCP capable;
determine that the hostname specified in the DNS query is the at least one of the hostnames having the two or more IP addresses;
in response to the DNS query, determine, using the memory, the first IP address corresponding to the at least one of the hostnames and corresponding to the first network device of the network devices that is MP-TCP capable; and send, to the client device, the DNS response including an indication of the first IP address.

2. The DNS device of claim 1, wherein to determine the first address corresponding to the at least one of the hostnames and corresponding to the first network device that is MP-TCP capable, the one or more processors are configured to:

parse the DNS query to identify an options information field of a set of information fields; and determine, based on the options information field, that the options information field indicates a request that the DNS response include an indication of the one of the IP addresses corresponding to a respective network device that is MP-TCP capable.

3. The DNS device of claim 1, wherein the one or more processors are further configured to:

receive configuration data specifying a subset of network devices of the set of network devices that are MP-TCP capable; and store, in the memory, data indicative of the subset of network devices that are MP-TCP capable.

4. The DNS device of claim 1, wherein the one or more processors are further configured to:

send each transmission control protocol (TCP) synchronization (syn) packet of a set of TCP syn packets to a respective network device of the set of network devices, wherein a header of each TCP syn packet of the set of TCP syn packets includes a TCP flag requesting an MP-TCP capability of the respective network device of the set of network devices;

receive, from each respective network device of the set of network devices, a TCP acknowledged (TCP ack) packet of a set of TCP ack packets, wherein a header of each TCP ack packet of the set of TCP ack packets includes a TCP flag indicating whether the respective network device is MP-TCP capable;

determine, based on the TCP flag of each TCP ack packet of the set of TCP ack packets, whether each respective network device corresponding to a TCP ack packet of the set of TCP ack packets is MP-TCP capable; and store, in the memory, data representing whether each respective network device corresponding to a TCP ack packet of the set of TCP ack packets is MP-TCP capable.

5. The DNS device of claim 1, wherein to determine the first address corresponding to the at least one of the hostnames and corresponding to the first network device that is MP-TCP capable, the one or more processors are configured to:

determine the first IP address and a third IP address corresponding to the at least one of the hostnames, the third IP address corresponding to a third network device that is MP-TCP capable, wherein the one or more processors are further configured to:

determine the first IP address as being preferable over the third IP address to send to the client device in the DNS response.

6. The DNS device of claim 1, wherein the DNS query includes a set of query information fields comprising:

a name information field including the specification of the hostname, wherein the hostname is coded in binary format;

a type information field including a specification of a query type of the DNS query, wherein the query type is coded in binary format, and wherein the query type indicates that the DNS query represents a request to return one or more IP addresses;

a class information field including a specification of a query class, wherein the query class is coded in binary format;

a time-to-live (TTL) information field including a specification of an amount of time in seconds, wherein the amount of time is coded in binary format, and wherein the amount of time represents an elapsed time that passes before the DNS query is invalidated; and an options information field including the request for the MP-TCP capability, wherein the request for the MP-TCP capability is coded in binary format, the request for the MP-TCP capability occupying a single bit.

7. The DNS device of claim 1, wherein the DNS response includes a set of response information fields comprising:

a name information field including the specification of the hostname included in the DNS query, wherein the hostname is coded in binary format;

a data information field including data representing the indication of the first IP address corresponding to the at least one of the hostnames and corresponding to the first network device that is MP-TCP capable, wherein the data is coded in binary format;

a data length information field including an indication of a length in bits of the data information field, wherein the indication of the length in bits is coded in binary format;

a type information field including a specification of a data type of the data included in the data information field, wherein the specification of the data type is coded in binary format, and the data type is an IP address data type;

a class information field including a specification of a data class of the data included in the data information field, wherein the specification of the data class is coded in binary format; and an options information field including a specification of whether each IP address indicated in the data information field is MP-TCP capable.

8. The DNS device of claim 1, wherein to receive the DNS query, the one or more processors are configured to:

receive the DNS query according to User Datagram Protocol (UDP), and wherein the one or more processors are further configured to:

determine whether a size of the DNS response is greater than a threshold number of bytes.

9. The DNS device of claim 8, wherein the one or more processors determines that the size of the DNS response is not greater than the threshold number of bytes, and wherein the one or more processors are configured to:

send the DNS response to the client device according to UDP.

10. The DNS device of claim 8, wherein the one or more processors determines that the size of the DNS response is greater than the threshold number of bytes, and wherein the one or more processors are configured to:

send the DNS response to the client device according to Transmission Control Protocol (TCP).

11. A method comprising:

receiving, by one or more processors of a domain name system (DNS) device, a DNS query from a client device, the DNS query including a specification of a hostname and a request that a DNS response include an IP address corresponding to the hostname and corresponding to a network device that is multipath transmission control protocol (MP-TCP) capable, wherein the DNS device comprises a memory configured to store a list of Internet protocol (IP) addresses for a set of hostnames, at least one of the hostnames having two or more IP addresses including a first IP address and a second IP address, the memory further storing data representing, for each IP address of the IP addresses, whether a network device corresponding to an IP address of the IP addresses is capable of performing multipath transmission control protocol (MP-TCP), the network device being part of a set of network devices, the data for the at least one of the hostnames having the two or more IP addresses indicating that a first network device corresponding to the first IP address is capable of performing MP-TCP and that a second network device corresponding to the second IP address is not capable of performing MP-TCP;

determining that the hostname specified in the DNS query is the at least one of the hostnames having the two or more IP addresses;

in response to the DNS query, determining, using the memory, the first IP address corresponding to the at least one of the hostnames and corresponding to the first network device of the network devices that is MP-TCP capable; and sending, by the one or more processors, the DNS response to the client device, the DNS response including an indication of the first IP address.

12. The method of claim 11, wherein determining the first IP address corresponding to the at least one of the hostnames and corresponding to the first network device that is MP-TCP capable comprises:

parsing the DNS query to identify an options information field of a set of information fields; and determining, based on the options information field, that the options information field indicates a request that the DNS response include an indication of the one of the IP addresses corresponding to a respective network device that is MP-TCP capable.

13. The method of claim 11, further comprising:

receiving configuration data specifying a subset of network devices of the set of network devices that are MP-TCP capable; and storing, in the memory, data indicative of the subset of network devices that are MP-TCP capable.

14. The method of claim 11, further comprising:

sending each transmission control protocol (TCP) synchronization (syn) packet of a set of TCP syn packets to a respective network device of the set of network devices, wherein a header of each TCP syn packet of the set of TCP syn packets includes a TCP flag requesting an MP-TCP capability of the respective network device of the set of network devices;

receiving, from each respective network device of the set of network devices, a TCP acknowledged (TCP ack) packet of a set of TCP ack packets, wherein a header of each TCP ack packet of the set of TCP ack packets includes a TCP flag indicating whether the respective network device is MP-TCP capable;

determining, based on the TCP flag of each TCP ack packet of the set of TCP ack packets, whether each respective network device corresponding to a TCP ack packet of the set of TCP ack packets is MP-TCP capable; and storing, in the memory, data representing whether each respective network device corresponding to a TCP ack packet of the set of TCP ack packets is MP-TCP capable.

15. The method of claim 11, wherein determining the first IP address corresponding to the at least one of the hostnames and corresponding to the first network device that is MP-TCP capable comprises:

determining the first IP address and a third IP address corresponding to the at least one of the hostnames, the third IP address corresponding to a third network device that is MP-TCP capable, wherein the method further comprises:

determining the first IP address as being preferable over the third IP address to send to the client device in the DNS response.

16. The method of claim 11, wherein receiving the DNS query comprises:

receiving the DNS query according to User Datagram Protocol (UDP), and wherein the method further comprises:

determining whether a size of the DNS response is greater than a threshold number of bytes.

17. The method of claim 16, wherein the one or more processors determines that the size of the DNS response is not greater than the threshold number of bytes, and wherein the method further comprises:

sending the DNS response to the client device according to UDP.

18. The method of claim 16, wherein the one or more processors determines that the size of the DNS response is greater than the threshold number of bytes, and wherein the method further comprises:

sending the DNS response to the client device according to Transmission Control Protocol (TCP).

* * * * *